Patented Jan. 31, 1950

2,495,774

UNITED STATES PATENT OFFICE 2,495,774

PROCESS FOR THE MANUFACTURE OF C-NITROSOARYLAMINES

Stiles M. Roberts, Albany, N. Y., assignor to General Aniline & Film Corporation, New York, N. Y., a corporation of Delaware No Drawing. Application May 1, 1946, Serial No. 666,532

8 Claims. (Cl. 260—577)

This invention relates to the manufacture of C-nitrosoarylamines by nitrosation of the corresponding secondary arylamines and rearrangement of the N-nitroso compound. More particularly, it relates to a process of effecting the manufacture of the C-nitrosoarylamines by a one step process directly from the corresponding secondary arylamine.

The rearrangement of N-nitrosoarylamines to their corresponding carbon nitroso derivatives is a well known process. It has been described as early as 1886 by O. Fischer in connection with the preparation of p-nitroso-N-methylaniline, p-nitroso-N-ethylaniline, p-nitroso-N-ethyl-o-toluidine and 4-nitrosodiphenylamine in Berichte, volume 19, page 2994. With particular reference to the diarylamines, it has been found difficult to effect the rearrangement of the N-nitroso derivative to the C-nitroso compound. It has generally been necessary to first convert the diarylamine to its N-nitrosoamine derivative with nitrous acid, isolate this derivative and then isomerize it by treatment with anhydrous ethyl alcoholic hydrochloric acid. The N-nitroso derivative is generally dried after isolation before effecting the rearrangement.

The preparation of the C-nitrosodiarylamines, and particularly 4-nitrosodiphenylamine, from the corresponding secondary diarylamines in one operation without isolation of any intermediate N-nitroso compound is described in U. S. Patent 2,046,356 by Max Wyler et al. The Wyler process carries out the conversion under strictly anhydrous conditions. As a solvent for the diarylamine, there is employed an anhydrous alcohol, for example methyl alcohol, to which the dry hydrogen chloride is added in an absolute alcohol solution. The required alkali metal nitrite for the conversion is added in dry powdered form. When N-alkyl arylamines are used for this conversion, the same reaction can be accomplished, and was accomplished by O. Fischer, by merely adding a cold concentrated solution of a metal nitrite to an alcoholic hydrogen chloride suspension or solution of the base, but when using the diarylamines with the same reactants, Wyler applied strictly anhydrous conditions in order to accomplish the conversion in a single step.

I have now found that the inherently difficultly convertible diarylamines, as well as the easily convertible compounds, such as the alkyl arylamines, can be converted to the carbon nitroso derivatives in a single step in a much simpler manner and without the necessity of using difficultly obtainable reactants, such as dry hydrogen chloride, absolute alcohol and dry sodium nitrite, if phosgene, acid chlorides, sulfonyl chlorides or certain other halogen compounds are substituted for the hydrogen chloride. In this process I may use commercial grades of alcohol such as the low molecular weight aliphatic alcohols which normally contain water in percentages of from 1–5%. If desired, further amounts of water may be added and, of course, it is not necessary to use dry reaction vessels. There is no loss in yield and, as a matter of fact, improved yields of carbon nitrosodiarylamines of good quality are obtained in accordance with my process. The process is carried out in its preferred manner by passing the phosgene or other halogen compound into a suspension of the diarylamine and an alkali metal nitrite in a commercial grade of an alcohol, such as methanol, subsequently drowning the reaction mixture in an ice water mixture and finally isolating the carbon nitrosoarylamine by known methods most suitable to the specific amine employed. In some cases, the product may be filtered off as the hydrochloride following the drowning operation. In place of the phosgene, there may be used any member of the class consisting of acid chlorides, by which is meant compounds having the formula $$R-COCl$$

in which R is an organic radical, sulfonyl chlorides, the halides of boron and arsenic, the halides and oxy halides of phosphorus, antimony pentachloride and tin tetrachloride.

This process is not restricted to any particular secondary arylamines, but is of particular interest in the case of the diarylamines which are difficultly convertible in a one step operation to the C-nitrosodiarylamines. The process may be applied to any secondary arylamine capable of undergoing the formation of N-nitroso derivatives and rearrangement to C-nitrosoarylamines. Typical examples of compounds which are capable of such rearrangement are: diphenylamine, 2 - methyldiphenylamine, phenyl - α - naphthyl amine, di-1-naphthylamine, 3-methoxydiphenylamine, 3-methoxy - 3' - methyldiphenylamine, 3-methyldiphenylamine, 3 - chlorodiphenylamine, 3 - acetylaminodiphenylamine, 4 - acetylaminodiphenylamine, N-methylaniline, N-ethylaniline and N-ethyl-o-toluidine. The last three named are generally converted to the C-nitroso compounds by a one step process in an aqueous HCl medium, since these are the type of arylamines which are more easily convertible. However, they may also be converted in accordance with the process of this application.

Acid chlorides which may be used in place of the phosgene in this process include such aliphatic acid chlorides as acetyl chloride and propionyl chloride; aryl acid chlorides such as benzoyl chloride. Sulfonyl chlorides which may be used include such compounds as thionyl chloride and benzene sulfonyl chloride. Other halides which may be substituted for the phosgene includes halides of boron and arsenic, halides and/or oxy halides of phosphorus, antimony pentachloride and tin tetrachloride.

Although it is preferable to add the phosgene or other agent to a suspension of the arylamine and alkali metal nitrite in an alcohol solution, it is possible to first react the phosgene with the alcohol and add the arylamine to this mixture, after which the alkali metal nitrite may be incorporated. The amount of phosgene required to effect the conversion may vary, but for best results from 2 to 8 mols should be employed per mol of the base. The temperature at which the agent necessary for the nitrosation and rearrangement is added is preferably from 0 to 30° C., but the process is not necessarily limited to this range.

The following examples, in which the parts given are by weight unless otherwise stated, will serve to further illustrate the invention, but are not intended to limit its scope.

*Example 1*

One gram mol of diphenylamine is added to 400 grams of a commercial grade of methanol and at 25° C. 80 grams of sodium nitrite is sprinkled into the suspension as finely divided crystals. The whole is stirred and cooled to 0° C. while 250 grams of phosgene as a gas is passed into the mixture contained in a closed vessel during which the temperature is maintained at 0–5° C. The resulting suspension of the reddish brown 4-nitrosodiphenylamine hydrochloride is stirred at 0–5° C. for 6–8 hours longer to assure completion of the reaction and then poured on to 3000 grams of an ice water mixture. After stirring several hours during which the by-product, methyl chloroformate, is hydrolyzed, the desired compound is obtained by filtration. Yield, 90–95% of theory.

The free C-nitroso base may be obtained by slurrying the hydrochloride salt in water and neutralizing with sodium acetate or by other well-known procedures.

N-phenyl-p-phenylenediamine may be prepared from the nitroso derivative above in the usual manner using, for example, sodium sulfide, glucose or tin and hydrochloric acid as the reducing agent.

*Example 2*

One gram mol of diphenylamine is dissolved in 400 ml. of a commercial grade of methanol by warming the mixture to 45° C. The solution is cooled to 20° C. and 80 grams of dry powdered sodium nitrite are added after which the mixture is further cooled to 0° C. During two hours 375 grams of thionyl chloride are gradually added. The mixture is stirred four hours longer at 0° C. and then poured onto 2000 ml. of a water-ice mixture. The total volume is brought to 3500 ml. and after stirring for one-half hour, the precipitated 4-nitrosodiphenylamine is filtered and finally dried at 30° C. in an air drier. Yield, 85–90% of theory.

*Example 3*

Eighty grams of finely powdered dry sodium nitrite are added to a cooled solution of 219 grams of N-phenyl-1-naphthylamine in 600 grams of methanol and the whole cooled to 0° C. While maintaining the temperature at 0–5° C., 250 grams of phosgene are added gradually during 2½ hours. The composite is stirred for two hours longer at 0–5° C. and finally drowned in an ice water mixture. The nitroso derivative is obtained by filtration.

*Example 4*

Eighty grams of sodium nitrite as a fine dry powder are added to a cooled solution of 219 grams of N-phenyl-1-naphthylamine in 400 grams of methanol and the whole cooled to 0° C. During one hour at 0–5° C., 375 grams of thionyl chloride are added gradually and after stirring several hours the composite is drowned in an ice water mixture. The desired nitroso-N-phenyl-1-naphthylamine is obtained by filtration.

Having now described my invention and the best manner in which to perform it, what I claim is:

1. The process of producing a C-nitroso diarylamine which comprises reacting an alkali metal nitrite and an aliphatic alcohol media with an unsubstituted diarylamine in the presence of a chlorine containing compound selected from the class consisting of phosgene and thionyl chloride at a temperature not exceeding 30° C. while utilizing said chlorine containing compound to react with the water present to generate hydrogen chloride and maintain the reaction mixture in a substantially anhydrous condition.

2. The process of producing a C-nitroso diarylamine which comprises introducing into an aliphatic alcohol media containing an alkali metal nitrite and an unsubstituted diarylamine, a chlorine containing compound selected from the class consisting of phosgene and thionyl chloride at a temperature not exceeding 30° C. while utilizing said chlorine containing compound to react with the water present in the reaction mixture to produce hydrogen chloride and maintain the reaction mixture substantially anhydrous, drowning the reaction mixture in an ice water mixture and isolating the C-nitroso diarylamine.

3. The process of producing a C-nitroso diarylamine which comprises reacting at a temperature not exceeding 30° C. an unsubstituted diarylamine and an alkali metal nitrite in methanol in the presence of phosgene while utilizing the phosgene to react with the water present to produce hydrogen chloride and maintain the reaction mixture substantially anhydrous, drowning the reaction mixture in an ice water mixture and isolating the resulting C-nitroso diarylamine.

4. The process as defined in claim 1 wherein the aliphatic alcohol media is commercial methanol.

5. The process of producing a C-nitroso diarylamine which comprises passing phosgene at a temperature not exceeding 30° C. into a suspension of an unsubstituted diarylamine and an alkali metal nitrite in commercial methanol while utilizing the phosgene to react with the water present to produce hydrogen chloride and maintain the reaction mixture substantially anhydrous, drowning the reaction mixture in an ice water mixture and isolating the resulting C-nitroso diarylamine.

6. The process as defined in claim 5 wherein the phosgene is utilized in the proportion of from 2 to 8 mols per mol of the unsubstituted diarylamine.

7. The process as defined in claim 1 wherein the unsubstituted diarylamine is diphenylamine.

8. In the process of producing a C-nitroso diarylamine by reacting at a temperature not exceeding 30° C. an unsubstituted diarylamine with an alkali metal nitrite in an aliphatic alcohol in the presence of hydrogen chloride, the improvement which comprises generating the hydrogen chloride in the reaction mixture by the addition thereto of a chlorine containing compound selected from the class consisting of phosgene and thionyl chloride, the chlorine containing compound operating to maintain the reaction mixture in a substantially anhydrous condition.

STILES M. ROBERTS.

REFERENCES CITED

The following references are of record in the file of this patent:

UNITED STATES PATENTS

| Number | Name | Date |
|---|---|---|
| 1,079,246 | Houben | Nov. 18, 1913 |
| 2,046,356 | Wyler et al. | July 7, 1936 |

FOREIGN PATENTS

| Number | Country | Date |
|---|---|---|
| 170,446 | Switzerland | Sept. 17, 1934 |